United States Patent
Fors et al.

(10) Patent No.: US 10,417,752 B2
(45) Date of Patent: Sep. 17, 2019

(54) METHOD OF REDUCING PURPLE FRINGING IN IMAGES

(71) Applicant: Axis AB, Lund (SE)

(72) Inventors: Sebastian Fors, Lund (SE); Johan Jeppsson, Lund (SE)

(73) Assignee: Axis AB, Lund (SE)

( * ) Notice: Subject to any disclaimer, the term of this patent is extended or adjusted under 35 U.S.C. 154(b) by 95 days.

(21) Appl. No.: 15/783,713

(22) Filed: Oct. 13, 2017

(65) Prior Publication Data

US 2019/0114752 A1    Apr. 18, 2019

(51) Int. Cl.
*G06T 5/00* (2006.01)
*G06T 5/50* (2006.01)
*G06T 11/00* (2006.01)
*H04N 7/18* (2006.01)

(52) U.S. Cl.
CPC ........... *G06T 5/50* (2013.01); *G06T 5/009* (2013.01); *G06T 11/001* (2013.01); *G06T 2200/32* (2013.01); *G06T 2207/10024* (2013.01); *G06T 2207/20208* (2013.01); *G06T 2207/30204* (2013.01); *G06T 2207/30232* (2013.01); *H04N 7/183* (2013.01)

(58) Field of Classification Search
CPC ......... G06T 5/50; G06T 5/009; G06T 11/001; G06T 2200/32; G06T 2207/10024; G06T 2207/20208; G06T 2207/30232; H04N 7/183
See application file for complete search history.

(56) References Cited

U.S. PATENT DOCUMENTS

| 2008/0088857 | A1* | 4/2008 | Zimmer | H04N 1/56 358/1.6 |
| 2009/0147098 | A1* | 6/2009 | Li | H04N 1/6077 348/223.1 |
| 2011/0052053 | A1 | 3/2011 | Tomaselli et al. | |
| 2012/0082380 | A1 | 4/2012 | Fujiwara et al. | |
| 2012/0201454 | A1* | 8/2012 | Sato | H04N 9/646 382/167 |

(Continued)

OTHER PUBLICATIONS

"Removing Blue Fringe from Trees," Retouching Forum: Digital Photography Review, Apr. 1, 2005, <https://www.dpreview.com/forums/thread/1186774>, accessed Jul. 17, 2017.

(Continued)

*Primary Examiner* — Ping Y Hsieh
(74) *Attorney, Agent, or Firm* — Snyder, Clark, Lesch & Chung, LLP

(57) ABSTRACT

A method of reducing purple fringing in images captured by a camera, comprises: acquiring a raw image of a scene with an image sensor of the camera, demosaicing the raw image, and applying an adjusted color correction matrix to the demosaiced raw image. The adjusted color correction matrix is deduced by calibrating the spectral response of the image sensor to a color rendition chart to which the color data of a purple fringe has been added, and furthermore the color correction matrix is adjusted such that the image sensor response for color values of the purple fringe is transformed into color values of a predetermined replacement color following application of the color correction matrix.

20 Claims, 2 Drawing Sheets

Fig. 5b

(56) References Cited

U.S. PATENT DOCUMENTS

2012/0314947 A1* 12/2012 Komatsu ................ G06T 5/001
382/167

OTHER PUBLICATIONS

"CCD Camera Fringe Removal," GIMP Plugin Registry, Jun. 17, 2009, <http://registry.gimp.org/node/16848>, accessed Jul. 17, 2017.
"Color Correction Effects," Using Color Correction Effects in After Effects, Adobe Systems Incorporated, 2017, <https://helpx.adobe.com/after-effects/using/color-correction-effects.html>, accessed Jul. 17, 2017.

* cited by examiner

METHOD OF REDUCING PURPLE FRINGING IN IMAGES

FIELD OF THE INVENTION

The present invention relates to a method for processing images, in particular images captured by a video camera.

BACKGROUND

Images captured by a camera via an imaging system, such as a lens system, will inevitably comprise several distortions. There are different kinds of distortions, and the magnitude of their occurrence will depend on a number of factors, relating to the imaging system as well as features of the imaged scene, or of a combination of the two. The present invention relates to a particular type of optical aberration, namely chromatic aberration often referred to as "purple fringing" or "blue fringing".

The effect of purple fringing in an image is that a purple or magenta halo is formed around objects in a scene, and the effect is particularly conspicuous around edges where a dark area meets a bright area in the image. Chromatic aberration may be attributed to the fact that light of different wavelengths will refract differently when passing a refractive medium, more particularly a lens of an imaging system. For a lens, there are two types of chromatic aberration; axial, or longitudinal, chromatic aberration and lateral, or transverse, chromatic aberration. The axial chromatic aberration corresponds to that light of different wavelengths travelling parallel to an optical axis as it falls in on the lens will have a focal point at different positions along the optical axis. As a rule, the shorter wavelengths will have their focal points closer to the lens than light of longer wavelengths. The lateral chromatic aberration corresponds to that light falling in obliquely to the lens will have their focus in the same plane, but in different positions in that plane.

The effect of longitudinal chromatic aberration is colored areas in the image, since not all three colors (red, green, blue) may be imaged in focus at the same time, giving edges in the image a smeared appearance. The effect of lateral chromatic aberration may be more or less sharp fringes, particularly visible around edges and objects of high contrast in the image.

Different ways of eliminating or minimizing the effects of chromatic aberration are available in prior art, basically ranging from composing lenses of the imaging system in an appropriate way, thus forming an achromat, to post-processing of the images to remove the effects, of which the latter is disclosed in US2012/201454.

It is also known that various types of processing of images, having the purposes of improving the image in other ways, may enhance the adverse effects of chromatic aberration making blue fringing more prominent in the image. An example is the use of imaging with wide dynamic range (WDR) or high dynamic range (HDR), where a single image is the result of a longer and a shorter exposure image fused or merged together so as to increase the dynamic range of the resulting image.

The present invention aims at circumventing the effects of chromatic aberration in a straightforward manner, and which may be applied to a live stream of images, such as the images acquired with a digital video camera. As an added benefit, the invention may also reduce the effect of other distortions resulting in a chromatic error.

SUMMARY

In an effort to address issues relating to purple fringing the present invention provides a method of reducing purple fringing in images captured by a camera. The method comprises acquiring a raw image of a scene with an image sensor of the camera, demosaicing the raw image, and applying an adjusted color correction matrix to the demosaiced raw image. The adjusted color correction matrix is deduced by calibrating the spectral response of the image sensor to a color rendition chart to which the color data of a purple fringe has been added. The color correction matrix has been adjusted such that the image sensor response for color values of the purple fringe is transformed into color values of a predetermined replacement color following application of the color correction matrix.

Compared to prior art techniques the present invention accomplishes a purple-fringe reduction without any image processing step having to be added to an image processing pipeline of the camera, and thus without any negative effect on overall performance. Furthermore no additional hardware needs to be added. Further effects and advantages are presented in the detailed description.

In one or more embodiments, the predetermined replacement color is a color being less saturated than the color of the purple fringe. In a typical surveillance scene, colors are generally quite low-key, consisting of inner and/or outer walls, interior scenery, exterior scenery, pathways, etc. Furthermore, purple fringes typically occur in the high-contrast area between a bright area and a darker area, meaning that a saturated color will stand out. A reduction of saturation will therefore make the purple fringe less conspicuous.

In one or more embodiments, the predetermined replacement color may deviate less from a mean color value of the imaged scene than the color of the purple fringe does. Adjustment of the color in the direction of a mean color of the image, which typically is in the area of a gray color, reduces a user's attention of the purple fringe. In still other embodiments the predetermined replacement color actually is a color corresponding to a mean color value of the imaged scene. This may be measured in the actual scene, and it may also be selected by choosing a color correction matrix (CCM) for a typical scene.

In a specific embodiment, which may be combined with other embodiments, the predetermined replacement color is a gray color.

In other embodiments, the method may further comprise selection of an ambiance mode for the imaged scene, wherein each ambience mode is related to a unique color correction matrix. The selection of an ambiance mode, such as e.g. "night time", "daylight", "direct sunlight", "street light" etc. may facilitate the selection of a suitable color correction matrix. The ambience mode as such may be based on lighting parameters of the scene, or of a dominant color of the scene, or a combination of both.

Typically, the ambience mode would affect the color values of the purple fringe, or the color values for the predetermined replacement color, and thus the selection of which specific color correction matrix is to be used.

In yet another set of embodiments the method further comprises tracking the adjustments of the purple fringe color value throughout image processing, and forwarding a present value of the target color in an output image. The color correction matrix is generally applied very early in an image processing pipeline, and the subsequent processing may involve non-linear processes with respect to color adjustment, making it difficult or impossible to backtrack the colors presented in the output image and to deduce which of them that emanates from a purple fringe. If instead the color value for any area subject to a color adjustment for removal or alleviation of the effects of purple fringing is tracked, a user would have the opportunity to adjust that particular color value even further, in a very simple operation. Furthermore, it would possible to adjust the color (which now may be several colors) automatically by analyzing neighboring areas in the output image. One example would be to adjust a present color of such an area to the color of a neighboring area. In other embodiments color values of the target color may be adjusted so that a luminance value is closer to a brighter color adjacent to an area having the color of the purple fringe than to a darker color adjacent to the area having the color of the purple fringe.

In the above the color value for a purple fringe is mentioned as "a color", while in reality it may not necessarily consist of a single color value (in any particular color space), rather it may comprise a range or set of color values. The color value of the purple fringe may be determined for the specific camera in which the purple fringe reduction is to be performed. Alternatively, the color value of the purple fringe may be determined generically for use in several cameras.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

DETAILED DESCRIPTION OF EMBODIMENTS

Figure 1:
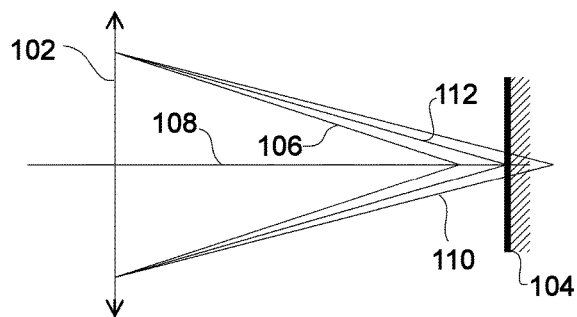
FIG. 1 is a schematic view illustrating the effects of axial chromatic aberration.
Figure 2:
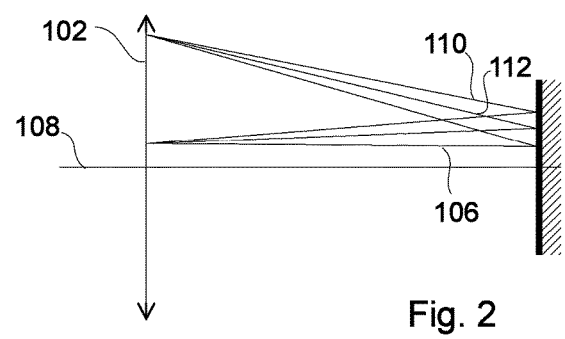
FIG. 2 is a schematic view illustrating the effects of lateral chromatic aberration.

Referring back to the background section of the present specification, and to FIG. 1 and FIG. 2, two examples of chromatic aberration are presented. FIG. 1 illustrates the effects of axial chromatic aberration. Light of three different wavelengths is refracted in an optical system comprising a lens 102 and a sensor 104. Due to wavelength-dependent differences a blue 106 ray falling in parallel to an optical axis 108 of the optical system will have its focal point at a different distance as compared to a red 110 ray or a green 112 ray.

Similarly, FIG. 2 illustrates the effect of lateral chromatic aberration, and here the resulting effect is that light emanating from the same point in a scene will be refracted so that the focal points of the different wavelengths will be shifted in a focal plane.

An achromatic lens system may be used to reduce the effects of this axial chromatic aberration to an acceptable level, at least for many use-cases. High-quality achromatic lens systems are, however, a costly solution, which may not be a realistic option for simpler imaging systems. Still, the effects of chromatic aberration, and in particular purple fringing, need to be addressed to the benefit of a user.

Figure 3:
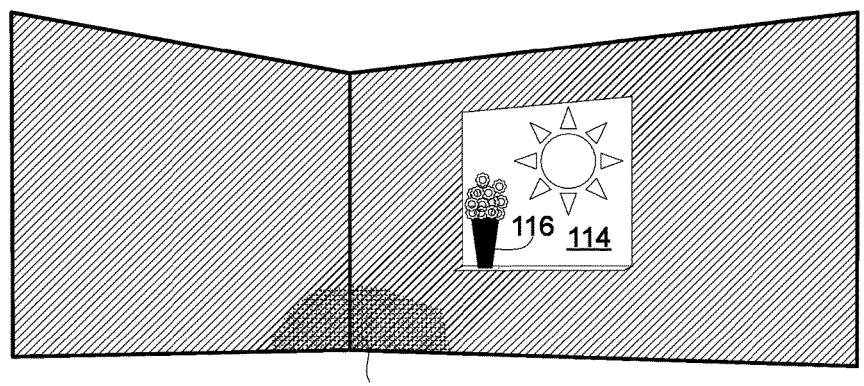
FIG. 3 is a schematic perspective view of a scene for which purple fringing may be pronounced.

FIG. 3 is a view of a scene where the effects of purple fringing may be pronounced. The scene is an interior scene, with the camera located inside a building. The scene, however, comprises both indoor and outdoor components. In particular, there is a bright area in the form of a window 114 exposed to direct sunlight, having a flower pot 116 in the windowsill. The window is surrounded by the darker interior of the room, down to the darkest corner 118, which creates sharp edges around the window 114 and the flower pot 116. These sharp edges are prone to generation of purple fringing. The generation may be further enhanced, in a detrimental way, by use of methods for creation of a wider dynamic range (of intensities) in the image, such as double exposure and fusion, and local tone mapping, contrast enhancing processing etc. The effect of chromatic aberration may be more pronounced on a darker side of an edge.

Figure 4:
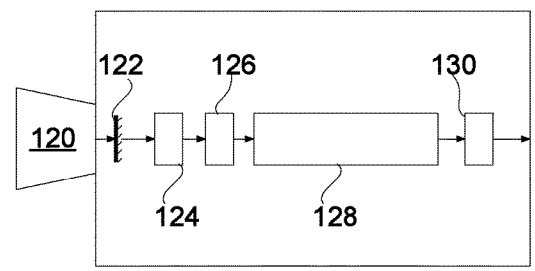
FIG. 4 is a schematic view of an imaging system.

FIG. 4 is a schematic view of an imaging system, in this case a digital video camera. The imaging system has a lens system 120 imaging a scene on an image sensor 122. The image sensor 122 is provided with a Bayer filter, such that different pixels will receive radiation of a particular wavelength region, in a known pattern. After having read the signal of individual sensor pixels of the image sensor 122, demosaicing is effected 124. At this point the color information in the scene has been extracted, i.e. the detected signal from the scene has been separated into red, green, and blue. However, there is no guarantee that the color reproduction is correct, and therefore a color correction matrix is applied 126 on the demosaiced sensor output. The color correction matrix could be described as a calibration matrix taking a wavelength dependent response for each pixel of the image sensor into account. In a straightforward process, the color correction matrix is deduced by imaging a known target with the imaging system, the target typically being a color rendition chart, such as the Macbeth ColorChecker. Consequently, there is a target of known color properties, a resulting image sensor response, and a color correction matrix that when applied should bring the sensor response closer to the known target, effectively resulting in an optimization task leading to an optimal color correction matrix (see FIG. 5a, to be described). An error in color may be described in different ways, and there are many algorithms for deducing a minimum total error. The present invention does not advocate any specific color error measure or optimization algorithm. When applying the color correction matrix, the response from the image sensor (following demosaicing) is transformed to, or at least closer to, the value it should have according to the color rendition chart. Today, the actual step of performing imaging of the color rendition chart may be left out, and by using spectral response data for the particular sensor and imaging system, a color correction matrix may be deduced.

Following application of the color correction matrix, the response from the image sensor, pixel for pixel, should have been corrected to a true, or at least more accurate, color representation in which a total color error is minimized. The resulting image is forwarded to an image processing pipeline 128. It should be noted that the application of a color correction matrix could be said to be included in an image processing pipeline 128 and whatever definition, it would be included within the scope of the present invention as defined by the claims. In the image processing pipeline, further processing is performed on the image. Such further processing may be noise filtering (for eliminating spatial and/or temporal noise), distortion correction (for eliminating effects of, e.g., barrel distortion), global and/or local tone mapping (e.g., enabling imaging of scenes containing a wide range of intensities), transformation (e.g., rotation), flat-field correction (e.g., for removal of the effects of vignetting), application of overlays (e.g., privacy masks, explanatory text), etc. The image processing pipeline may also be associated with an analytics engine performing object detection, recognition, alarms, etc.

Following the image processing pipeline the image may be forwarded to an encoder 130, wherein the information is coded according to an encoding protocol and forwarded to a receiving client, to a server, a cloud storage, etc.

When post-processing images for removal of the effects of purple fringing it is known to locate the position of the fringes, either manually through visual inspection, or by an automatic process. Following the localization, the fringes are removed by replacing their color with a suitable background or object color (the color that should have been there). Regardless if such methods are performed manually or automatically, they tend to demand resources in terms of time or computational power, in particular if performed on a live video stream.

In the teachings of embodiments of the present invention it is suggested to use processes already in place to reduce the effects of purple fringing. This approach results in advantages to be described. For the present invention, part of the solution lies in the addition of color patches to the color rendition chart. Specifically, the color of purple fringes may be added in one or more additional patches. Furthermore, a weight factor for each extra patch may be added, so as to enable setting of the impact of the particular patch in comparison to the other colors of the color rendition chart. Consequently, each new patch, and its weight, will be included in the optimization process leading to the color correction matrix. However, and notably, in the optimization process the color of the purple fringes should be transformed to a more neutral, less conspicuous, color rather than to the actual color of the purple fringes. The weight may be varied, e.g., between 0 and 1, and its purpose is to enable that the inclusion of the additional color patches does not skew the original colors too much. In the example, a weight of 0 would imply that the error of the additional color patch is not included at all in the optimization process, while 1 would imply that the additional color patch is as important as any of the original color patches. In this context, it should be emphasized that in the generation of a color correction matrix for a digital camera there is generally no actual physical target, i.e., the color rendition chart is generally not a physical entity. Still, one has to know the spectral response of the camera sensor, the resulting color value for each color of the color rendition chart, and the "goal color" for each color of the color rendition chart. This means that rather than an additional patch the result is one or more additional parameters added to the minimization procedure when optimizing the color correction matrix.

Notably, several color correction matrices may be calculated, and the selection of which CCM to use for a particular scene may be left to an automatic selection process or a user decision. As will be discussed, the selection may be based on the lighting conditions, yet in the context of the weights mentioned, a user may select a color correction matrix having a greater weight (e.g. closer to 1) in order to reduce purple fringes to a greater extent, even if the result may be that other colors in the image will be skewed. This could be embodied as a number of CCM-profiles or CCM-modes.

When applied, the present invention, in its most basic embodiment, does not locate the purple fringes in the image. It simply adjusts their original color to a new, predetermined color. The appearance of the target color is the effect of chromatic aberration, and consequently it is not possible to "reverse engineer" the purple fringe color to the actual background or object color. Instead, the color correction matrix will be instructed to adjust the target color to a less conspicuous color, such as gray or merely a less saturated color. As will be discussed further below, actual objects in the scene having the same color as the purple fringe will also be adjusted to the target color.

In this way, the effects of purple fringing will be reduced in the resulting corrected image, and as such it will improve the user experience. Furthermore, this is accomplished without adding any further hardware or software to the imaging system, and without introducing any further requirements on computational power, since color correction would already have been included in the image processing.

In a further group of embodiments, it is acknowledged that the appearance of purple fringing may be affected by the prevailing lighting conditions. The appearance of purple fringing may, e.g., vary between scenes where the main light source is the sun, a street lamp, light bulbs, fluorescent lights etc. One effect is that the wavelength, the color tone, of the purple fringing may shift one way or another. Since knowing the color of the purple fringes may be important for the efficiency of embodiments of the present invention it is sensible to generate several color correction matrices for various scenes, such that a suitable color correction may be applied for a particular scene. It may be noted that the knowledge of the scene lighting properties is not essential for the present invention, though it may be an advantage. One example of this could be that if the properties of the scene illumination is not known one may have to apply a broader color interval for correction of the purple fringing, and the correction will consequently be less precise. If the lighting properties are known, on the other hand, the color of the purple fringes may be targeted more precisely, with less detrimental effects for the rest of the image (accidental replacement of colors that are similar to the purple fringes).

The detection of lighting conditions may be automatic, and may be performed in a very simplistic manner. During day-time, if the scene includes an outdoor portion, the sun is the most likely light source, while it is surely not during night hours. The skilled person realizes that more elaborate techniques may be used for detecting the main light source of a scene, such as spectrometers, photosensors, while manual input etc. also may be used. Furthermore, straightforward image analysis, or evaluation of the image metadata may be used to deduce a dominant color temperature in the scene.

In still further embodiments, the target color is replaced with a bright gray color, the reasoning being that the effects of purple fringing are mainly visible in edges between bright areas and dark areas, and by using a bright gray color it may better blend in with the background color. In other embodiments, the scene illumination or other properties of the scene or imaging optics results in that the purple fringing is more pronounced in the dark portion of an edge, thus making it more appropriate to replace the color of the purple fringe with a darker gray. A further thing to consider, is that the color correction matrix will distinguish and operate on a color (purple), not on an object having a color (a purple fringe), meaning that any object having the color of a purple fringe will be automatically recolored. This may be a less desired effect of the present invention, and though it is not believed to occur too often in a surveillance scene it may be enough to decide that it is not desirable to shift to a dark gray color but rather to a bright or neutral gray.

The method may in other embodiments be more refined, and given that one goal is to shift the color of a purple fringe to a less conspicuous color while affecting the overall appearance of the image to a minimal degree, there may be other options than gray. One approach is to use an average color of an image. It is not desired to use a feedback mechanism and enter the average color for the image or image frame just acquired, yet it would be possible to use known image statistics for the purpose. Furthermore, it would be possible to refine such method by using statistics of a similar scene (to the one for which correction is to be performed). Using the average color does not necessarily imply that the color of purple fringes is replaced with the exact average color, although such approach would be possible. Rather, the average color is used as a reference color in the sense that the replacement color should have a similar luminance, or higher, or lower, if the scene so requires. Referring back to the previous description, it may often be advisable to reduce the color saturation of the resulting color, which will effectively result in the variation of gray colors previously discussed.

In still other embodiments the replacement color is a dominant color in the area of the purple fringes, or the replacement color is found by determining the colors involved in high-contrast edges of the image scene in question.

In an imaging system of the type presented in FIG. 4 there may be issues with traceability of original colors since it is not only the color correction matrix that affects the color balance. The downstream processing of the image (e.g., global/local tone mapping) in the image processing pipeline may also affect the color balance making it difficult to deduce, in the output image, the present color of former purple fringes. In one embodiment, therefore, the image processing pipeline is set up to keep track of the color adjustments throughout the entire processing, and to make such information available either directly (e.g., as metadata transmitted with the image) or as stored information. In this way, a user may be supplied with enough information to make further, more refined, adjustments in post-processing of the image or video stream. In some, or even most, practical situations, where there are numerous non-linear and local operations performed on an image, such as tone mapping and sharpening, the approach described in the previous paragraph may be quite costly from a processing perspective, while for others it may offer added benefits.

Figure 5A:
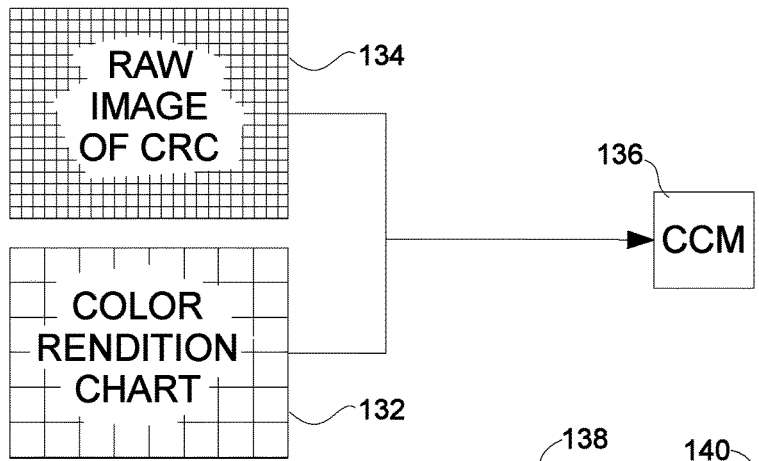
FIGS. 5a and 5b are images illustrating the generation (5a) and application (5b) of a color correction matrix
Figure 5B:
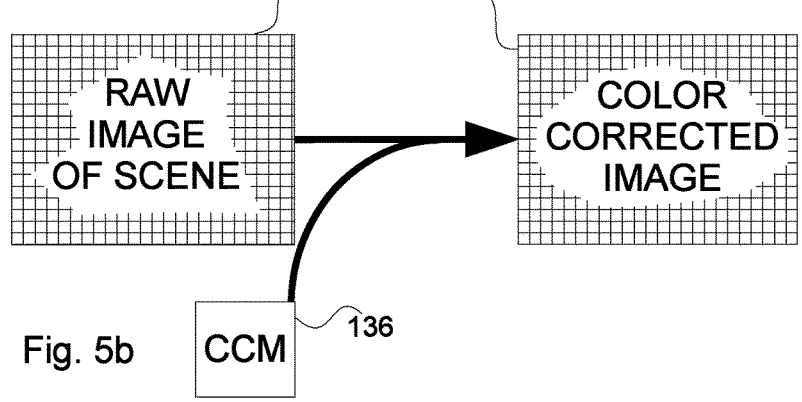

For the sake of completeness FIGS. 5a and 5b illustrate the generation and application of a color correction matrix (CCM), in brevity. The generation is shown in FIG. 5a, illustrating how a color rendition chart 132 is imaged by a camera (not shown), and how the known characteristics of the color rendition chart are combined with the actual response of an image sensor 134 of the camera and provide the parameters necessary for the deduction of the CCM 136. The CCM 136 may now be stored in the camera, in or in association with the image processing pipeline. When the camera is used to image a new scene, a software application may ensure that the correct CCM 136 may be applied to the response 138 from the image sensor to correct the color response of the camera in a corrected image 140, as indicated if FIG. 5b. In this context, it should be mentioned yet again that characteristics of the image will be corrected further in subsequent processing of the image, and the role of the CCM is to ensure that artifacts generated by the spectral response of the image sensor are reduced or eliminated.

Figure 6:
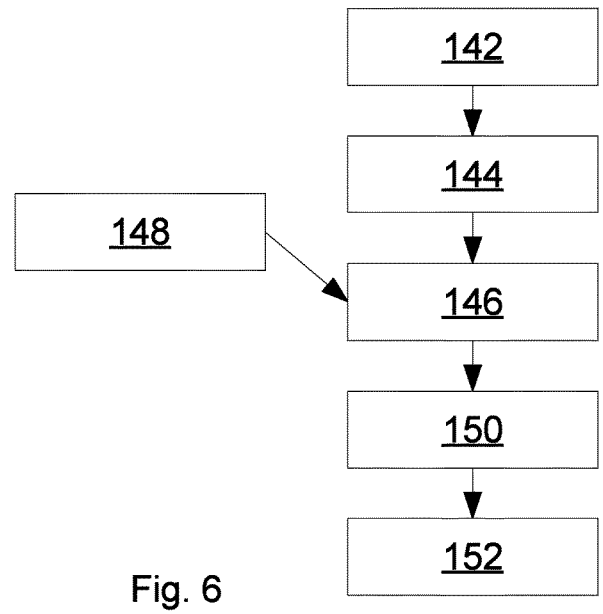
FIG. 6 is a flow chart illustrating a method according to one embodiment of the present invention.

FIG. 6 illustrates a method according to an embodiment of the present invention. In a first step 142 an image of a scene is acquired using the camera, and a resulting raw image is read from the sensor. The raw image is demosaiced in step 144, and in a third step 146 an adjusted color correction matrix applied to the demosaiced image. The adjusted color correction matrix to be used has been elected in a separate step 148, which may be based on a user selection, or an automatic selection, as previously discussed.

In further embodiments (also illustrated by FIG. 6 for brevity) the corrected image may be forwarded 150 to an image processing pipeline (to which both the demosaicing and the color correction may be said to be included), and finally to an encoder before being transferred from the camera in step 152. Use of the inventive method enables removal of purple fringes in a live video stream from a digital video camera, without any need of additional hardware or software modules, without an increase computational load, and without any post processing.

It will be appreciated that a person skilled in the art can modify the above-described embodiments in many ways and still use the advantages of the invention as shown in the embodiments above.

Thus, the invention should not be limited to the shown embodiments but should only be defined by the appended claims. Additionally, as the skilled person understands, although features of embodiments are given in separate claims, they may also be combined.

The invention claimed is:

1. A method of reducing purple fringing in images captured by a camera, the method comprising:
   acquiring a raw image of a scene with an image sensor of the camera,
   demosaicing the raw image,
   applying an adjusted color correction matrix to the demosaiced raw image,
      wherein the adjusted color correction matrix is deduced by calibrating the spectral response of the image sensor to a color rendition chart to which the color data of a purple fringe has been added, and wherein the color correction matrix is adjusted such that the image sensor response for color values of the purple fringe is transformed into color values of a predetermined replacement color following application of the color correction matrix;
   tracking the adjustments of the purple fringe color value during image processing;
   forwarding a present value of the target color in an output image, wherein the present value is used as input in further processing of the image, and wherein the further processing comprises altering the present value of the purple fringe color value further, by including further image information, comprising:

altering the present value of the target color to a color adjacent to the target color in the image, wherein color values of the target color are adjusted so that a luminance value is closer to a brighter color adjacent to an area having the color of the purple fringe than to a darker color adjacent to the area having the color of the purple fringe.

2. The method of claim 1, wherein the predetermined replacement color is a color being less saturated than the color of the purple fringe.

3. The method of claim 1, wherein the predetermined replacement color deviates less from a mean color value of the imaged scene than the color of the purple fringe.

4. The method of claim 3, wherein the predetermined replacement color is a color corresponding to a mean color value of the imaged scene.

5. The method of claim 1, wherein the predetermined replacement color is a gray color.

6. The method of claim 1, further comprising selecting an ambience mode, wherein each ambience mode is related to a unique color correction matrix.

7. The method of claim 6, wherein the ambience mode is based on lighting parameters of the scene, or of a dominant color of the scene, or a combination of both.

8. The method of claim 7, wherein the ambience mode affects the color values of the purple fringe, or the color values for the predetermined replacement color, and thus the selection of which specific color correction matrix is to be used.

9. The method of claim 6, wherein the ambience mode affects the color values of the purple fringe, or the color values for the predetermined replacement color, and thus the selection of which specific color correction matrix is to be used.

10. The method of claim 1, wherein the purple fringe color value is a range of colors.

11. A device, comprising:
an image sensor to acquire a raw image of a scene; and
an image processor to:
  demosaic the raw image,
  apply an adjusted color correction matrix to the demosaiced raw image,
    wherein the adjusted color correction matrix is deduced by calibrating the spectral response of the image sensor to a color rendition chart to which the color data of a purple fringe has been added, and
    wherein the color correction matrix is adjusted such that the image sensor response for color values of the purple fringe is transformed into color values of a predetermined replacement color following application of the color correction matrix,
  track the adjustments of the purple fringe color value during image processing,
  forward a present value of the target color in an output image,
  input the present value, wherein the present value is used as an input for further processing of the image,
  further process the image by altering the present value of the purple fringe color value further, by including further image information, and
  further process the image by altering the present value of the target color to a color adjacent to the target color in the image, wherein color values of the target color are adjusted so that a luminance value is closer to a brighter color adjacent to an area having the color of the purple fringe than to a darker color adjacent to the area having the color of the purple fringe.

12. The device of claim 11, wherein the predetermined replacement color is a color being less saturated than the color of the purple fringe.

13. The device of claim 11, wherein the predetermined replacement color deviates less from a mean color value of the imaged scene than the color of the purple fringe.

14. The device of claim 13, wherein the predetermined replacement color is a color corresponding to a mean color value of the imaged scene.

15. The device of claim 11, wherein the predetermined replacement color is a gray color.

16. The device of claim 11, wherein the image processor is configured to select an ambience mode, wherein each ambience mode is related to a unique color correction matrix.

17. The device of claim 16, wherein the ambience mode is based on lighting parameters of the scene, or of a dominant color of the scene, or a combination of both.

18. The device of claim 17, wherein the ambience mode affects the color values of the purple fringe, or the color values for the predetermined replacement color, and thus the selection of which specific color correction matrix is to be used.

19. The device of claim 16, wherein the ambience mode affects the color values of the purple fringe, or the color values for the predetermined replacement color, and thus the selection of which specific color correction matrix is to be used.

20. The device of claim 11, wherein the purple fringe color value is a range of colors.

* * * * *